Sept. 11, 1951 A. BOSSHARD 2,567,634
RUBBER THREAD CUTTING APPARATUS
Filed March 25, 1947 3 Sheets-Sheet 1

INVENTOR
ALFRED BOSSHARD
BY
ATTORNEYS

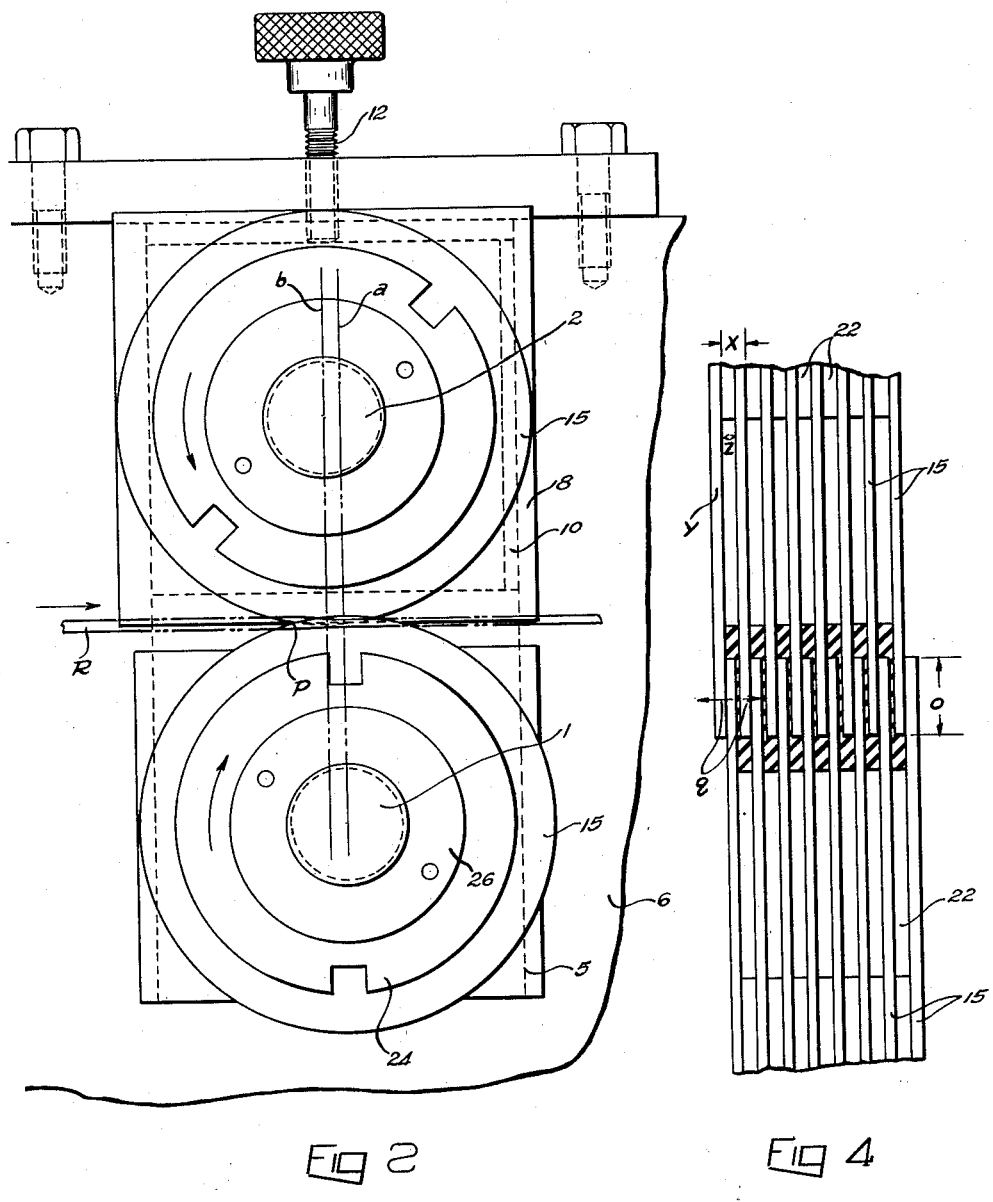

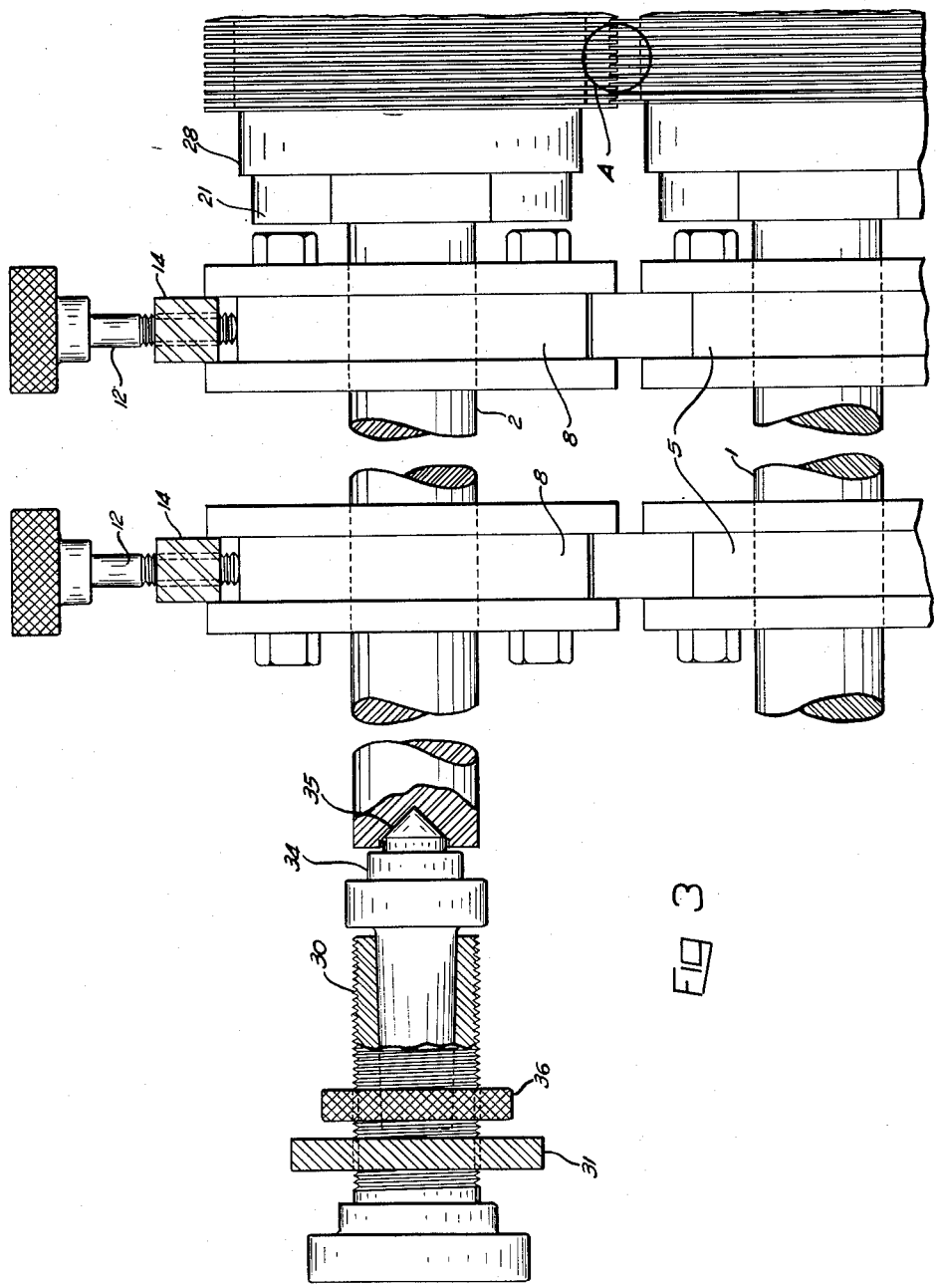

Patented Sept. 11, 1951

2,567,634

UNITED STATES PATENT OFFICE 2,567,634

RUBBER THREAD-CUTTING APPARATUS

Alfred Bosshard, Akron, Ohio, assignor to Andrews-Alderfer Processing Company Incorporated, Akron, Ohio, a corporation of Ohio Application March 25, 1947, Serial No. 737,060

7 Claims. (Cl. 164—60)

This invention relates to improvements in apparatus for cutting rubber sheets into threads and particularly to that type of apparatus which employs two gangs or sets of disk-like knives which run in overlapping and interleaved relation so that the rubber sheet is cut into a multiplicity of threads by the shearing action of the overlapping knives.

This general type of cutting mechanism is known in the art but prior mechanisms have numerous disadvantages which are not present in the mechanism shown and described herein.

Multiple cutting knives of this character have been of two distinct types, one in which a plurality of knife-edged disks run in close overlapping shearing relation so that each thread is cut by the shearing action between both edges of a knife and the edges of the adjoining knives. In mechanisms of this type it is customary to exert a heavy spring pressure along the axis of the knife shafts which support the knives which forces the edges of the knives into shearing relation. The other type of cutting apparatus to which reference should be made comprises a multiplicity of disk-like knives, the peripheries of which are ground to thin razor edges which run in overlapping shearing relation.

One of the most serious objections to the use of mechanisms of either type set forth is that the knives wear rapidly and tend to break or chip under the pressures which are applied to them to keep their cutting edges in positive cutting engagement. The cost of keeping the knives in proper cutting condition and of repairing and replacing dull or broken knives is a very heavy burden on the production of cut rubber thread.

Another disadvantage is that the knives of either type often do not cut accurately. It is quite customary in the manufacture of rubber threads and particularly rubber threads of the finer sizes to elongate the threads cut from uncured or partially cured rubber stocks so as to reduce their cross section permanently. It is essential in the manufacture of fine threads by such procedures, that the original threads be very accurately cut; otherwise, the thin or thick regions thereof will become greatly accentuated during the subsequent drawing operations. The cutting device shown herein is a great improvement over the old style cutting knives because the threads are accurately cut from the original rubber sheet.

The apparatus shown herein is an improvement over prior devices of this nature because the arrangement of the knives is such that the pressure which keeps adjacent knives in shearing contact is supplied by the rubber itself. This feature will be better understood from the description which is to follow, it being sufficient to say that, except for the application of manual pressure to start the operation correctly, the knives are kept in shearing contact by the compression of a portion of the several threads between the face of one knife and the opposing face of an adjacent knife. The pressure exerted by the rubber holds the knives in shearing contact but due perhaps to the fact that the pressure is exerted by the rubber itself, the knife edges retain their proper cutting surfaces much longer than knives in which mechanical pressure is relied upon to hold the shearing edges in contact.

The invention has a further feature of novelty in that the sets of knife disks are angularly offset with respect to each other so that the cutting edges are brought into contact as the knives revolve with a true shearing action. This is accomplished by arranging the shafts on which the knives are carried at a slight angular relation with respect to each other. This angular misalignment of the shafts may be varied, but is always a relatively small angle in the neighborhood of from 3° to 5°.

In the drawings and in the description an actual working embodiment of the invention is disclosed, but it will be appreciated that this is solely for the purpose of making a full and complete exposition of the invention so that it may be clear to those familiar with this art. It is not intended that the invention be confined to the details set forth, as modifications and variations may be adopted and used within the teachings of the invention and without departing therefrom. In certain particulars detailed dimensions of certain parts and relationships between the parts will be given, but this, likewise, is only for the purpose of explaining the principles of the invention.

In the drawings:

Fig. 2 is a front view looking at the ends of the knife bearing shafts, this view showing the angular offsetting of the shafts which gives the shearing action.

Fig. 3 is a side elevation, parts being broken away to reduce the overall dimensions of the view.

Fig. 4 is a greatly enlarged section taken at the cutting points to show the manner in which the knives are held in shearing relation by the rubber. A location for this view is indicated by the circle A in Fig. 3.

Figures 1, 5:
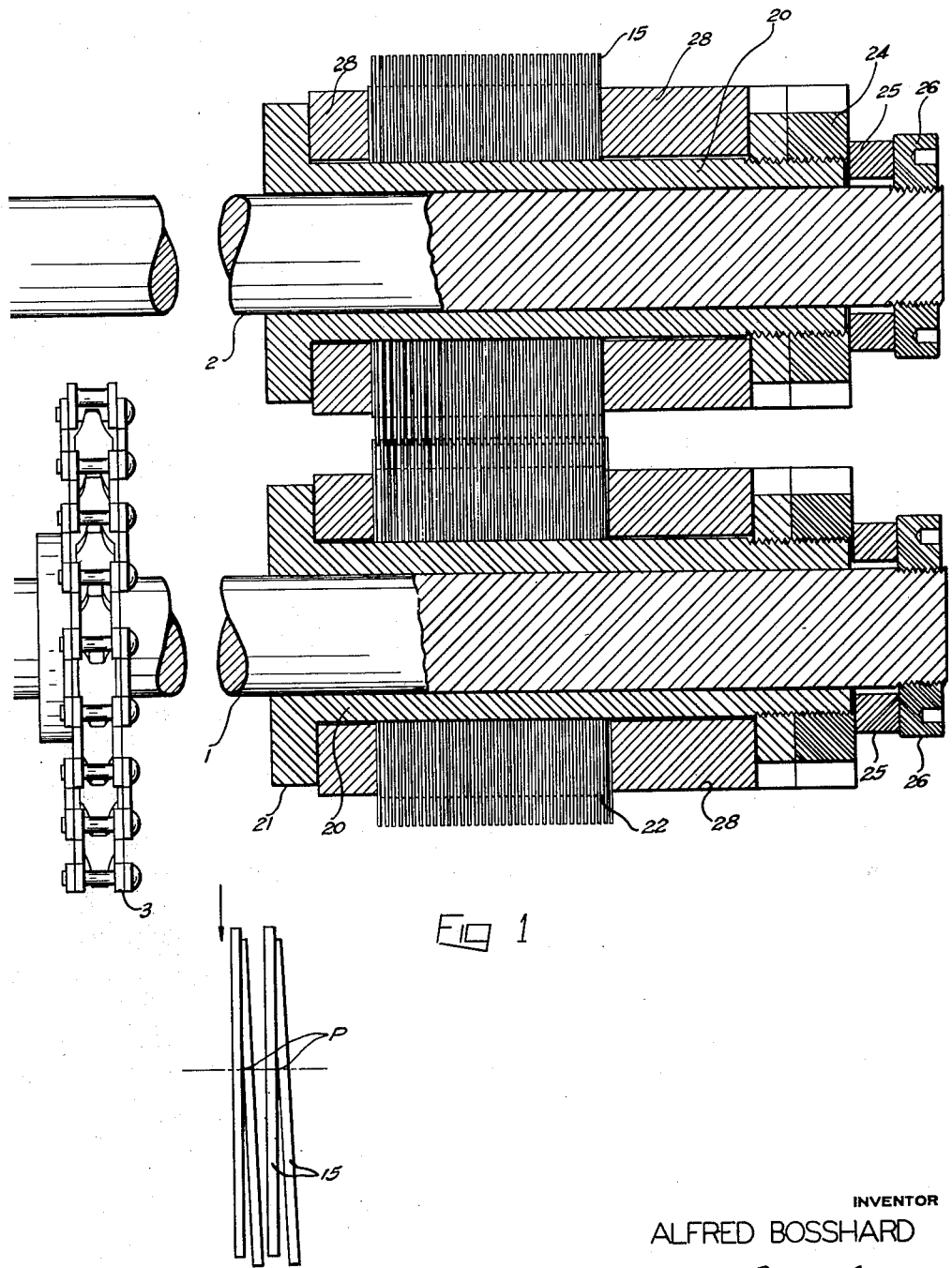
Fig. 1 is a vertical section taken along the two knife bearing shafts showing the overlapping or interleaved relation of the disk-like knives.
Fig. 5 is in the nature of a diagrammatic view showing in exaggerated form the principle of the angular offsetting of the knives.

While the mechanism shown and described herein is primarily intended for cutting a sheet of uncured or partially cured rubber into threads which are to be later stretched and permanently elongated to make very fine threads, the mechanism is equally adapted for cutting threads from cured rubber stocks or other plastic material. Also, it is not considered necessary to show the drawing apparatus by which the threads are drawn out of the knives, it being found desirable to stretch the threads as they issue from the knives so as to assist in freeing the rubber stock from the surfaces of the knives. It is also advisable to lubricate the knives to assist in the withdrawal of the threads, and this may be done by keeping the surfaces of the knives well lubricated by a common soap and water solution.

In the embodiment of the invention shown herein there are two shafts mounted one above the other on which the two gangs of overlapping knives are mounted. In the form shown the knives are mounted on the ends of the shafts, but this location of the knives is not essential. The numeral 1 is applied to the lower shaft and the numeral 2 is applied to the upper shaft. It is necessary to drive one of these shafts only, as the other will revolve by frictional contact, and the lower shaft 1 is shown with a driving means indicated by the sprocket and chain 3. By rotating one shaft only, the cutting surfaces tend to shift with respect to one another as the knives rotate. It is preferred to mount the lower shaft in journal boxes 5 located in a suitable frame indicated at 6 and to have this shaft at right angles to the frame and to the line of travel of the rubber sheet, the latter being indicated at R and moving in the direction of the arrow applied thereto.

The upper shaft 2 is located in journal boxes 8 in the machine frame but is held at the angular relation to the shaft 1, as noted above, by shims 10 which may be replaceable so as to obtain the requisite and desired angularity between the two shafts. It is possible to provide for the correct angularity of the two knife bearing shafts by shifting either shaft with respect to a true right angled relation to the frame, or to divide the angular misalignment between the two shafts, but in the form of the invention shown the upper non-driven shaft has been selected as the one which is angularly offset. The reason for offsetting the knives is to cause the edges of the knives to run in an actual shearing relation which cuts the rubber threads cleanly and accurately. The degree of offsetting may vary as explained within certain limited angles. The dotted line $a$ running through the center of the shaft 1 and the dotted line $b$ running through the center of the shaft 2 are placed on the drawing to direct attention to this angular offsetting. This angular offsetting of the knives is also shown in Fig. 5, which view, however, makes no attempt to show dimensions of the knives or the degree of angular offsetting.

The upper journal boxes 8 are held in correct vertical adjustment by thrust screws 12 threaded in cross pieces 14 on the frame. The degree of vertical adjustment is regulated by the amount of overlap which is to be provided between the faces of the upper and lower knife disks.

The knives are carried on the ends of the shafts 1 and 2 which project outwardly of the machine frame. The number of knives which constitute a gang is not restricted except by the width of the sheet which can be conveniently handled. There is no attempt in the drawings to show the actual number of knives which may be used. In actual practical commercial operations conducted with the machine shown, between one and two hundred knives constitute a single set on a shaft.

The knives are flat, steel disks indicated by the numeral 15 throughout the drawings. The edge of each disk is perpendicular to the faces of the disk. Each set of knives is like the other except that it is desirable to have one more knife in one of the sets so that the number of threads will equal the number of knives in the lesser set.

The knives of a set are fitted over a sleeve 20 which is force fitted on the central shaft 1 or 2. One end of each sleeve is provided with a shoulder 21. Between each pair of knives is located a spacer disk 22 which for the reasons to be explained is somewhat thicker than the knife disk. Each stack of knives with the alternating spacers is held rigidly against the shoulder 21 by pair of lock nuts 24 threaded on the end of the sleeve 20, and these lock nuts are further backed up by a washer 25 and a lock nut 26 threaded on the end of the shaft. To fill out the shaft, collars 28 are located at either side of the gang of knives.

As shown in Figs. 1 and 3, the knives are run in overlapping or interleaved relation with one face of a knife on the lower shaft in contact with one face of a knife on the upper shaft. As the spacers are slightly thicker than the knife blades, the actual edge to edge contact between adjoining knife disks is on one edge only of each disk. This is more clearly shown in Fig. 4. As the plane of the knives is not exactly parallel, the edges of the knife blades are in actual shearing contact and this is set so the points of contact are presented to the sheet of rubber as it enters the knives as indicated by the letter $p$ on Figs. 2 and 5. As the knife blades are made of a very high carbon steel and therefore somewhat springy, the shearing contact actually tends to cause the edge of each knife to sharpen itself against the other knife of the pair.

The peculiar spacing of the knife blades which is greatly magnified in Fig. 4 has a very definite and beneficial result. To explain this operation and without intending in any manner to limit the practice of the invention, it may be assumed that the machine is cutting a sheet of rubber .020" in thickness. It is usually desirable to cut square threads. As the actual shearing operation which divides a thread from the sheet is done between the contacting surfaces of two adjacent pairs of knives, the distance between two such contacting points is fixed as .020". This would, in the cited example, be the dimension indicated at $x$ in Fig. 4. Of course, it is not essential that the thread be square cut in which case the dimension $x$ would not be the same as the thickness of the stock.

However, in the example cited with a dimension of .020" at $x$ in Fig. 4, the thickness of each knife disk, or the dimension $y$ on this same figure, is somewhat less than one-half of $x$ and may be .009". The spacers are somewhat thicker than one-half of $x$, and in the example cited this makes the dimension z on Fig. 4 at .011" leaving a space between the non-cutting faces of adjacent disks on the upper and lower shafts respectively of .002". The extent of overlapping of the knives of the upper and lower set is an important consideration and in the specific example cited this dimension indicated at o in Fig. 4 should be about $\frac{1}{16}$".

It will be understood that the dimensions given above have been stated merely for the sake of explaining one embodiment of the invention and that these dimensions are subject to wide variation in the limits of practicability.

Due to the arrangement of the knives and the spacers, the body of rubber constituted on one thread does not pass through the knives square in cross section but is forcibly deformed into the shape shown in Fig. 4, being converted into a cross sectional shape which is composed of two offset approximately square sections or lobes connected by a thin web which is crowded in the space between two adjacent but non-contacting knife blades. The forcible distortion of the central portion of each rubber thread into this small space or throat creates an immense aggregate pressure in the direction of the two arrows $q$ in Fig. 4 which forcibly holds the shearing edges of the companion knives in shearing contact. When these forces, each of which may seem to be relatively small, are multiplied by the number of threads, the pressure holding the knives in shearing contact is enormous. The pressure is, in fact, so great that it is wholly unnecessary to back up the knives with any mechanical force, and once the cutting operation has been started, the machine will operate, cutting the threads with greater accuracy than is possible with mechanical forcing means such as used hitherto. In addition to the above, the pressure generated by the distortion of the rubber in the channel or throat provided by the overthickness of the spacers 22 with relation to the knives 15, is apparently exactly what is needed to insure accurate and clean shearing of the rubber for each spring metal knife blade is held against its mating blade by the pressure created by rubber under compression. The fact that the pressure is always adequate and never too harsh for the cutting operation being performed imparts to the knives greater longevity than has been obtainable in other types of thread cutting apparatus.

The cutting edges of the knives will eventually dull, but a new set of cutting surfaces may be obtained by reversing the position of the sleeves 20. This result may be accomplished by turning one of the sets of knives end-for-end, or it may be done by shifting the sets of knives, i. e., moving the set which is on one shaft to the other shaft. Either procedure will bring fresh cutting edges in contact.

It is necessary in starting a sheet of rubber through the cutters to insure that the cutting operation will start with the sets of knives in shearing contact, and for this purpose the shaft 2 is provided with manual means to feed the knives of the upper set against the knives of the lower set. For this purpose the shaft 2 has a slight longitudinal movement in its bearings and may be forced to the right as shown in Fig. 3 by a pressure bolt 30 threaded into a portion of the machine frame shown at 31. The inner end of the bolt has a tapered center pin 34 adapted to engage the tapered seat 35 in the end of the shaft 2. A lock nut 36 is threaded on the bolt 30, and after the operation is started, this may be turned down against the face of the bracket 31 which holds the shaft rigid.

It has been attempted to advance a theory which may account for the results obtained by the use of gangs of shearing knives arranged in the manner set forth. The success of the device is believed to be due to the fact that the rubber is placed under sufficient compression in passing through the machine so that it reacts against the thin, flexible blades to hold them in perfect shearing contact with a yielding force acting directly on the cutting areas of the knives at all times. It might be possible to so correlate the thickness of the knife blades and the thickness of the spacers that the compression forces would be reduced, which accomplishes the purposes of the invention, although not as efficiently as in the specific embodiment shown.

While the machine is adapted for the cutting of rubber threads, filaments, tapes or the like, other materials which react in a similar way may be cut therein. All types of rubber whether natural or synthetic can be successfully subdivided by the mechanism shown. Where the term "rubber" is used in the claims, it will be understood that it is intended to cover all plastic materials which will react in a manner similar to rubber.

What is claimed is:

1. A machine for subdividing a sheet of rubber or the like into a multiplicity of threads comprising two sets of rotatable cutting disks arranged in interleaved relation, said disks having plane faces and edge portions at right angles thereto, said disks being arranged with one flat face of each disk of a set in overlapping contact with a flat face of one disk of the other set over a relatively small arc, the axis of one set of disks being offset angularly with respect to the axis of the other set of disks.

2. A machine for subdividing a sheet of rubber or the like into a multiplicity of threads comprising two sets of rotatable cutting disks in interleaved relation, said disks having plane faces and edge portions at right angles thereto, said disks being spaced apart at distances greater than the thickness of a disk, and being arranged with a flat face of each disk in a set in contact over an arc with a flat face of a disk of the other set so that relatively narrow throats are provided between the non-contacting faces of the disks, the axis of one set of disks being angularly arranged with respect to the axis of the other set of disks to hold the cutting edges of the disks in shearing relation.

3. An apparatus for cutting a sheet of rubber or the like into a multiplicity of threads, a plurality of cutting disks comprising one set of knives, and a second plurality of cutting disks comprising a second set of knives, the knives of said sets being in interleaved relation, one knife being in contact with one face only of a knife in the other set, the non-contacting faces of adjacent disks providing restricted channels in which the central portions of the threads are compressed, the sets of knives being angularly arranged so that the cutting edges of the knives are maintained in shearing relation.

4. In a machine for subdividing a sheet of rubber or the like into a multiplicity of threads, a pair of rotatable shafts, a set of disk-like knives on each shaft, each knife having flat faces and an edge portion at right angle thereto, the knives of each set being spaced apart a distance greater than the thickness of a knife, the sets of knives being arranged in interleaved and overlapping relation with a face of each knife in contact with one face of a knife in the other set and spaced from the face of the next adjacent knife of the other set to provide a narrow throat into which the central portion of a thread is compressed in passing through the knives, the shafts being arranged in angular relation with respect to each other to hold the cutting edges of the knives in shearing relation.

5. In a cutting device for subdividing a sheet of rubber or the like into a multiplicity of threads, the combination of a plurality of spring steel disks arranged in two opposed, rotatable sets with the disks of one set interleaved and overlapped with the disks of the other set and with the face of each disk in contact with a face of one disk of the opposite set and spaced from the face of the next adjacent disk of the opposite set a sufficient distance to provide a narrow channel of such dimension that a portion of the thread is compressed in passing through the device, the disks of each set being parallel and concentric but the axes of concentricity of the two sets of disks being disposed at a slight angle with respect to one another.

6. A machine for subdividing a sheet of rubber or the like of a given thickness into a multiplicity of threads comprising two sets of rotatable cutting disks arranged in interleaved relation, said disks having plane faces and sharpened cutting edges and arranged with one flat face of each disk of a set in overlapping contact with a flat face of one disk of the other set over a relatively small area, the noncontacting faces of the disks in the respective sets being spaced to provide channels narrower than the thickness of the sheet into which portions of the threads are compressed, the axis of one set of disks being offset angularly with respect to the axis of the other set of disks to hold the sharpened edges of contacting disks in shearing relation.

7. In a machine for subdividing a moving sheet of rubber or the like into a multiplicity of threads, a pair of rotatable shafts, a set of disk-like knives on each shaft, each knife having flat faces and a cutting edge, the knives of each set being spaced apart a distance greater than the thickness of knife, the sets of knives being arranged in interleaved and overlapping relation with a face of each knife in contact with a face of a knife in the other set, the opposite face of said knife being spaced from the opposing face of the next adjacent knife of the other set to provide a throat narrower than the thickness of the sheet which is being subdivided so that a portion of the thread is compressed therein, the said shafts being arranged in angular relation to each other to hold the cutting knives in shearing relation at points where the sheet enters the knives.

ALFRED BOSSHARD.

REFERENCES CITED

The following references are of record in the file of this patent:

UNITED STATES PATENTS

| Number | Name | Date |
|---|---|---|
| 815,491 | Tschantz | Mar. 20, 1906 |
| 1,525,590 | Perrault | Feb. 10, 1925 |
| 2,031,566 | Pranz et al. | Feb. 18, 1936 |